(12) United States Patent
Smythe et al.

(10) Patent No.: US 6,418,214 B1
(45) Date of Patent: Jul. 9, 2002

(54) NETWORK-BASED CONFERENCE SYSTEM

(75) Inventors: Philip C Smythe; Andrew D Mercer, both of Ipswich; Michael Gardner, Woodbridge, all of (GB)

(73) Assignee: British Telecommunications public limited company, London (GB)

( * ) Notice: Subject to any disclaimer, the term of this patent is extended or adjusted under 35 U.S.C. 154(b) by 0 days.

(21) Appl. No.: 09/091,503

(22) PCT Filed: Sep. 25, 1997

(86) PCT No.: PCT/GB97/02607

§ 371 (c)(1),
(2), (4) Date: Jun. 19, 1998

(87) PCT Pub. No.: WO98/13995

PCT Pub. Date: Apr. 2, 1998

(30) Foreign Application Priority Data

| | | |
|---|---|---|
| Sep. 25, 1996 | (GB) | 9620000 |
| Sep. 27, 1996 | (GB) | 9620260 |
| Mar. 12, 1997 | (GB) | 9705097 |
| Apr. 16, 1997 | (EP) | 97302615 |

(51) Int. Cl.[7] ............................................. H04M 3/42
(52) U.S. Cl. ........................ 379/202.01; 379/203.01; 379/204.01; 379/206.01
(58) Field of Search ............................... 379/201, 202, 379/203, 204, 205, 209, 202.01, 203.01, 204.01, 205.01, 206.01, 207.1

(56) References Cited

U.S. PATENT DOCUMENTS

| 4,653,090 A | * | 3/1987 | Hayden | 379/204 |
| 5,619,555 A | * | 4/1997 | Fenton et al. | 379/67 |
| 5,751,338 A | * | 5/1998 | Ludwig, Jr. | 348/17 |
| 5,841,763 A | * | 11/1998 | Leondires et al. | 370/260 |
| 5,991,385 A | * | 11/1999 | Dunn et al. | 379/202 |
| 6,072,780 A | * | 6/2000 | Johnson, Jr. et al. | 379/202 |
| 6,091,808 A | * | 7/2000 | Wood et al. | 379/201 |
| 6,226,678 B1 | * | 5/2001 | Mattaway et al. | 709/230 |

* cited by examiner

Primary Examiner—Ahmad F. Matar
Assistant Examiner—Hector Agdeppa
(74) Attorney, Agent, or Firm—Nixon & Vanderhye PC

(57) ABSTRACT

A management and control unit for a network-based conferencing system has an interface for outputting control signals to a platform for establishing audio connections across a network between users. Another interface receives control signals from a platform for providing a graphical user interface to a user, for use in controlling the conferencing system. The unit has access to a database for maintaining management data relating to one or more existing conferences. The management and control unit receives control signals input by a user at the graphical user interface in respect of an audio conference, and outputs control signals to the platform for establishing audio connections. An audio conference can thus be established between the user and at least two other users over the network. Management data can be transmitted to the graphical user interface during a conference for use in managing the conference.

42 Claims, 7 Drawing Sheets

NETWORK-BASED CONFERENCE SYSTEM

BACKGROUND OF THE INVENTION

1. Field of Invention

The present invention relates to management of network-based conference systems and finds particular application in audio-conferencing with a screen-based user interface.

2. Related Art

Although the majority of telephony based traffic is between just two parties, the technology to provide an audio mix between a larger number of people has existed on public telephone networks for several years. Commercial services allowing 3-way conferencing are available to users of digital exchanges and services which allow tens or even hundreds of users to be connected into an audioconference via operator control also exist. Telephony based audio conferencing now provides high quality audio for groups of 10 or more and it is cheaper and less intrusive than video conferencing; noise reduction algorithms have meant that the sound quality is increasingly good. On the other hand audio conferencing systems tend to be either expensive or awkward to use since they require either the memorisation of arcane dual tone multi-frequency (DTMF) control codes or that users should set up the conference via an operator.

Telephony, or telecommunications, in this context is the type of communication which can be provided by means of a switch-based network and usually involves the establishment of a particular route through a network between terminals, a connection, by means of a set-up procedure. Communication for the course of a communication session, such as a telephone call, follows the same route through the network between the terminals. The connection is then cleared down at the end of the communications session. This is in contrast to a data network of the type in which packets of data may take different routes across the network and have to be reassembled in a correct order at a receiving terminal.

Internet based audio conferencing applications have started to become available. They allow groups of people anywhere in the world to talk to each other using packet switched protocols such as Remote Procedure Calls (RPC). These systems allow conferences to be set up and controlled relatively easily via a graphical user interface. This communicates with a server based application which controls which people can talk to each other. Users can see text labels or images which represent both themselves and other users and can take advantage of the relatively intuitive and powerful control and feedback facets of a graphical user interface. Many of these systems follow a 'rooms' based metaphor in which each conference takes place in a room. Users can wander from room to room taking part in conversations as they go.

The problem with this kind of system is that voice quality is contingent upon both the bandwidth of the connection to each user being sufficiently large and the overall performance of the network being above a given threshold. This makes it difficult to guarantee an acceptable level of sound quality for all users at all times. There is also a problem with echo caused by delays in digitally encoding speech from each user; this means that users hear their own voices repeated after a delay at the remote end(s) unless all users wear headphones. Finally some service providers are seeking to ban, limit or charge extra for services which use demanding protocols such as RPC.

There are a number of audiographic standards which already exist to support the integration of telephony with shared computer applications. Most notable of these are the ITU's T.120, H.320, H.323 and H.324 series of recommendations which detail communication protocols appropriate for audiographic teleconferencing. These allow services to be constructed which involve the integration of telephony with computer applications and facilitate features such as shared electronic whiteboards. The T.120 standards are based on the premise that a client system will run software which is capable of integrating computer and telephony applications together. The disadvantage of these systems is that each client system must possess and be capable of running software which is compatible with the standard. System developers must also be familiar with the Applications Programming Interfaces (APIs) upon which the system is based.

The issue of integration of communications services is discussed in "The Internet Telephony Red Herring" by Colin Low, published in Hewlett Packard Laboratories Technical Report dated June 1996, Palo Alto, US, at pages 1–15.

SUMMARY OF THE INVENTION

According to the present invention, there is provided a management and control unit for a network-based conferencing system, the unit comprising:

i) an interface for outputting control signals to a platform for establishing audio connections across a network between users;

ii) an interface for receiving control signals from at least one platform for providing a graphical user interface to a user for use in controlling the network-based conferencing system; and iii) access to a database for maintaining, including updating, management data relating to one or more existing conferences such that the management and control unit can receive control signals input by a user at the graphical user interface in respect of an audio conference, output control signals to the platform for establishing audio connections, thereby establishing an audio conference connection between the user and at least two other users over the network, and output management data to the graphical user interface during an existing conference for use by the user in managing the conference.

Preferably the network is a telecommunications network while the interface for receiving control signals is an interface to a data network, such as the Internet. Preferred embodiments of the present invention can then enable users to enjoy high quality audio-conferencing which they can manage using a World Wide Web screen-based interface. Such embodiments can allow users to work on worldwide web based material yet not require that they i) set up calls via an operator, ii) remember DTMF control codes, iii) invest in new telephony hardware, or iv) install specialist software.

The management and control unit can be supported by a server, such as a Web server connected to the Internet, while the graphical user interface may be provided at a client, also connected to the Internet. The management and control unit can then provide a powerful and very versatile tool in providing audio-conferencing.

Audio conferencing systems according to preferred embodiments of the present invention can combine the ease of use of a GUI based system whilst also leveraging the reliable voice quality associated with the phone network. Such systems can impose minimum technical or cognitive requirements on each user and preferably use established protocols wherever possible.

The system can allow anybody who has simultaneous access to an Internet (or similar) connection, to provide the graphical user interface, and a separate directly diallable phone line to setup, control, record and clear down high quality audio conferences.

Preferably, the database is used to maintain updatable information specific to each user. This information can include for instance images of the users involved in a conference so that, whilst they are using the system, they can see annotated pictures of anybody else who is connected.

Not only is there no need for users to remember control codes but they do not need to know the phone number of other participants. Conferences can be made private and users can change their outgoing telephone number when they move from one location to another.

Although described in relation to the Internet, embodiments of the present invention would also be useful where connected to other networks in place of the Internet. Clearly, embodiments of the present invention would also be relevant where the user is connected to a less extensive network than the Internet, or to a company "Intranet".

Preferred embodiments of the present invention demonstrate tight integration between software running on the client, the associated WWW server, an audioconferencing platform and a database.

Embodiments of the present invention allow a World Wide Web (WWW) based graphical user interface (GUI) to control a telephony based audio conference. No additional software is necessary at the client and the system can be available to any user with a Transmission Control Protocol/Internet Protocol (TCP/IP) connection to the Internet and a phone line.

The audio conferencing system can be linked with a Worldwide Web server and its associated database.

In preferred embodiments, the system is capable of keeping track of several parallel conferences each of which may involve several users. Each user can be shown the appropriate information detailing where they are on the system as well as where others are; this information can be updated whenever changes relating to a given user occur.

Each user can preferably control aspects of the system which they have the privileges to change. This should preferably be done without creating a conflict.

Finally the entire system is preferably designed so that users can be billed appropriately and so that it is secure against fraudulent use.

BRIEF DESCRIPTION OF THE DRAWINGS

An audioconferencing system according to an embodiment of the present invention will now be described, by way of example only, with reference to the accompanying Figures in which.

DETAILED DESCRIPTION OF EXEMPLARY EMBODIMENTS

Figure 1:
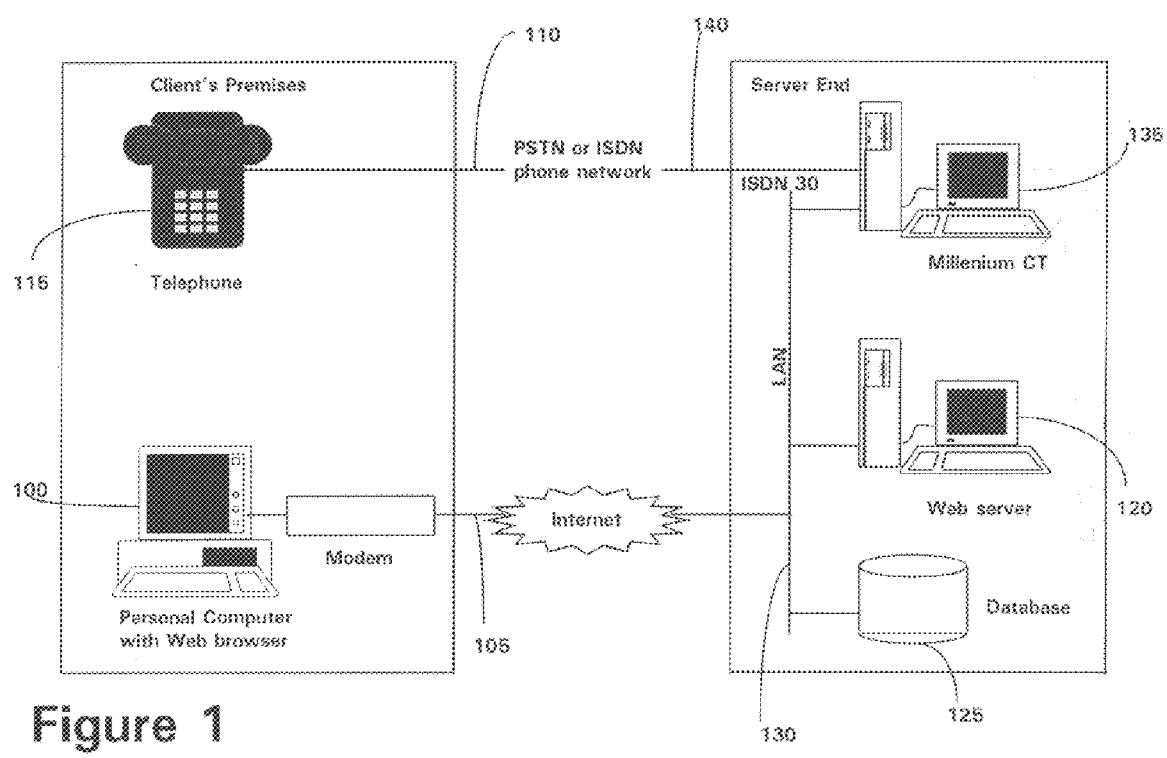
FIG. 1 shows a diagram of the system platform and its context.

Referring to FIG. 1, each user has a personal computer 100 with an Internet IP connection 105, and a web browser application which supports HTML3.2 (or later), together with Frames and either Javascript or Jscript. They must also have a separate telephony connection 110 with a telephone 115 which can be directly dialled. Possible network configurations to support this include the use of a) 2 Public Switched Telecommunications Network (PSTN) lines, b) an Integrated Services Digital Network (ISDN) 2 connection where one B channel is used for voice and the other for data, or c) the combination of a Local Area Network (LAN) and Private Branch Exchange (PBX) connection.

At the server end of the system, there is a Worldwide Web server 120 which can dynamically produce HTML pages by Simple Query Language (SQL) based reference to a database 125. It can also write information to the database 125.

The WWW server 120 is also connected via a RFC1006 socket level connection 220 to an Acculab Millenium CT (RTM) platform 135. This is a PC-based device, described in copending British patent applications 9619958.3 filed on Sep. 25$^{th}$, 1996 and 9707712.7 filed on Apr. 16$^{th}$, 1997 by the same application (and corresponding to U.S. application Ser. No. 09/029,615 filed Mar. 5, 1998), the contents of which are incorporated herein by reference, which has a number of capabilities including the ability to set up, control and record audio conferences. Prior to its launch as a product it was known as Minor Applications Platform (MAP). The Millenium CT is connected between a telecommunications network, such as the Public Switched Telecommunications Network (PSTN), and a data network, such as the Internet. It accepts incoming service requests over the PSTN via an ISDN30 connection 140. It can also accept incoming service requests in other ways, for instance via a RFC1006 socket level connection as mentioned above. In this case, the protocol will be implemented on both sides of the socket level link. It also provides processing capacity and it can respond to an incoming call or message by identifying and launching an appropriate computing application which calls on and manages resources to run the service requested.

The Millenium CT 135 is equipped with means for providing audio bridges between conference participants, in the form of digital line interface cards and controls therefor. Additionally, the Millenium CT provides speech related resources, such as recording and delivery. It therefore can provide facilities which are important in communicating with a user during conference set-up and for recording.

For the purposes of the audioconferencing system however, any device which can accept and send commands over a network connection and use these commands to generate and record audio conferences could be used as an alternative to the Millenium CT. It should be noted there are also a number of equivalent link protocols which could be used in substitution for ISDN30.

Server Software Architecture

The Server 120 may be any workstation with a WWW server and an object-oriented development environment providing integrated database access. The system shown in FIG. 2, provides a "WebRex"™ WWW server 120, an "Oracle"™ database 125, and a "NextStep"™ operating system, and four objects.

Figure 2:
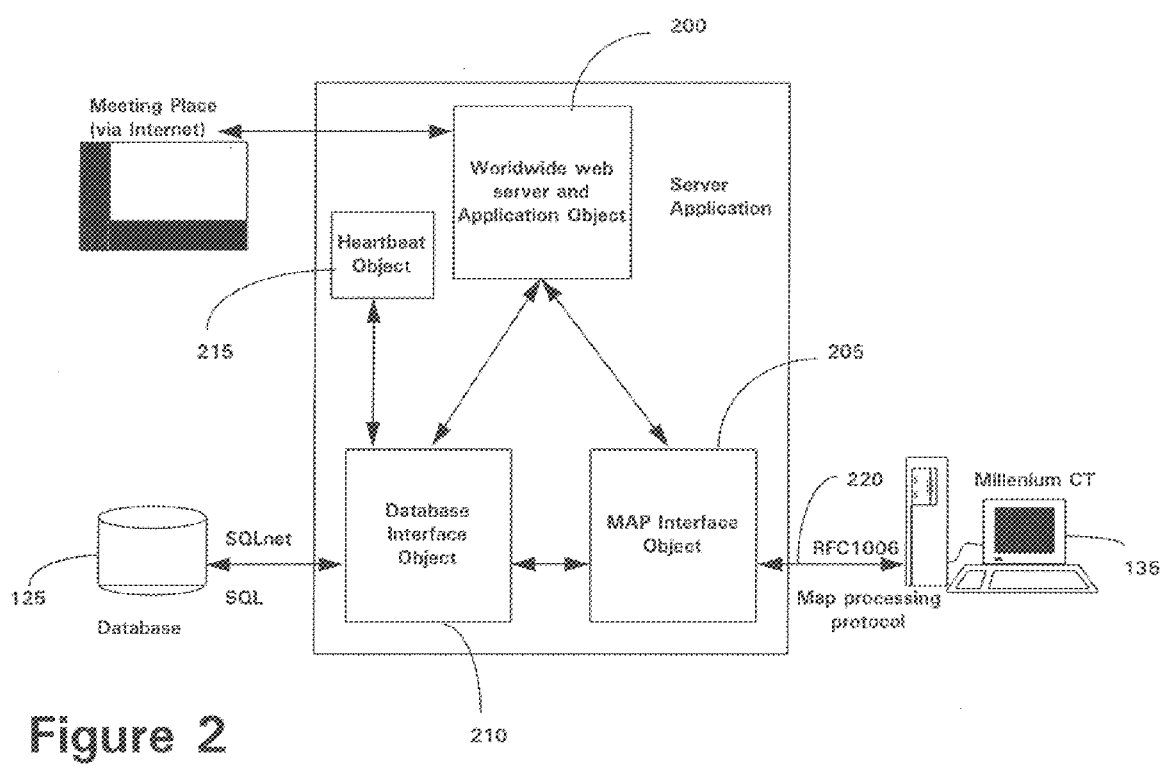
FIG. 2 shows a schematic diagram of the server side architecture for the system shown in FIG. 1.

Referring to FIG. 2, the server 120 supports an application comprising four objects. These objects 200, 205, 210, 215, are further described below. Functions within the objects are called from other objects by name; the NextStep operating system automatically generates the messages interchanged between the objects in a manner similar to Remote Procedure Calls (RPC).

The Application Object 200

This is linked into the WWW server 120 to provide a set of multiply re-entrant, memory resident functions. These functions are called in an HTML request from the user and allow conferences to be set-up and managed using functions provided by the Millenium CT interface object 205 (or MAP object).

The MAP Object 205

This receives requests from the application object 200 and controls the Millenium CT 135 by sending it commands and polling it for commands and for responses to previously sent messages. The RFC1006 protocol (running over TCP/IP) is implemented in the MAP object 205 and on the Millenium CT 135 to provide a reliable peer-to-peer protocol for message passing.

As it may take some time (a few seconds) to process a request from the application object, the MAP object queues a request in a CONFERENCE-REQUEST database table (further discussed below under "The Database"). An initial (HTML) response is sent back to the client, indicating that a request is being processed.

The MAP object 205 is implemented as an event driven state machine since the requests usually require a number of messages to be interchanged with the Millenium CT. The state of the request is stored in the CONFERENCE REQUEST database table entry (further discussed below under "The Database"). The MAP object 205 polls the CONFERENCE-REQUEST table for user requests frequently (for instance once every 5 seconds). Once a request is found, the command sequence is initiated by sending the first command to the Millenium CT 135. The MAP object 205 polls the Millenium CT 135 for a response at regular intervals (for instance once every second); once a response is received the MAP object 205 identifies which conference the response refers to (from a conference number field in the response). It then determines the current state from the request stored in the CONFERENCE REQUEST table and issues the next command to the Millenium CT 135.

The messages sent to the Millenium CT 135 are:
Register Platform (establishes a TCP/IP connection)
Conference Registration (register or de-register a conference with the Millenium CT)
Call Dial (call a specified telephone number)
Mix all Participants (mix the calls into an audio conference)
Call Clear (remove caller from the conference)
Record Start (start recording the conference)
Record Stop (stop recording the conference)
Record Delete (delete the recording)
Record Save (save the recording to a file)
Playback Start (playback the recording from the beginning)
Playback Stop (stop the playback process)
and the commands returned by the Millenium CT 135 are:
Call clear (call cleared by remote party)
Record stop (stop recording the conference (run out of resources))

The Database Interface Object 210

This may more simply be called the Database object 210. It provides functions for use by the application and MAP objects 200, 205. The functions store and retrieve information about the people who are using the system and the audio-conferences in an Oracle database 125. The functions use embedded SQL.

The Heartbeat Object 215

This logs users out if it believes the user has closed down their meeting place window and left the system. This is further described under "The Heartbeat Process" below.

Millenium CT Application

In order to implement the setting up and management of a conference from the server, the Millenium CT 135 is provided with an application which can receive commands from the MAP object 205 and respond by supplying the functions required. These are for instance establishing audio bridges between the conference participants, delivering speech messages, such as "Please wait", and recording and storing sound for later access. The form of such an application of course is adapted to receive and respond to the messages set out above under "Millenium CT Object 205", and this determines the functionality of the Millenium CT application. The application will be compatible with the operating system of the Millenium CT 135 which may for instance be UNIX but could be another operating system.

The Database

The database 125 is used to store information about people using the system and about audio conferences. Any relational or object-oriented database is sufficient though the present system uses an Oracle database accessed using Simple Query Language. This is called from functions in the application and Database objects 200, 210. Oracle sequences are used to generate unique conference numbers.

The tables used in the Oracle database are as follows:

| TABLE NAME | FUNCTION |
| --- | --- |
| CONFERENCE REQUEST | A queue of requests from users to take part in an audio conference |
| CONFERENCE | A list of all the current conferences together with information on whether they are being recorded |
| PERSON | A list of the people who are in each conference |
| CONFERENCE PERSON | Information about each person such as their login name, password, on-line status (1 = logged in, O = logged out), personal URL (see under "Sharing URLs" below), image and conference number (if in a conference). |
| ADDRESS | Contains each person's telephone number |

Logging Onto the System

The database 125 holds information which includes the name, phone number and image of each user who is registered with the system. A registered user logs onto the system by starting up their browser 100 and then submitting a request for the system's access URL to the server 120.

Figure 3:
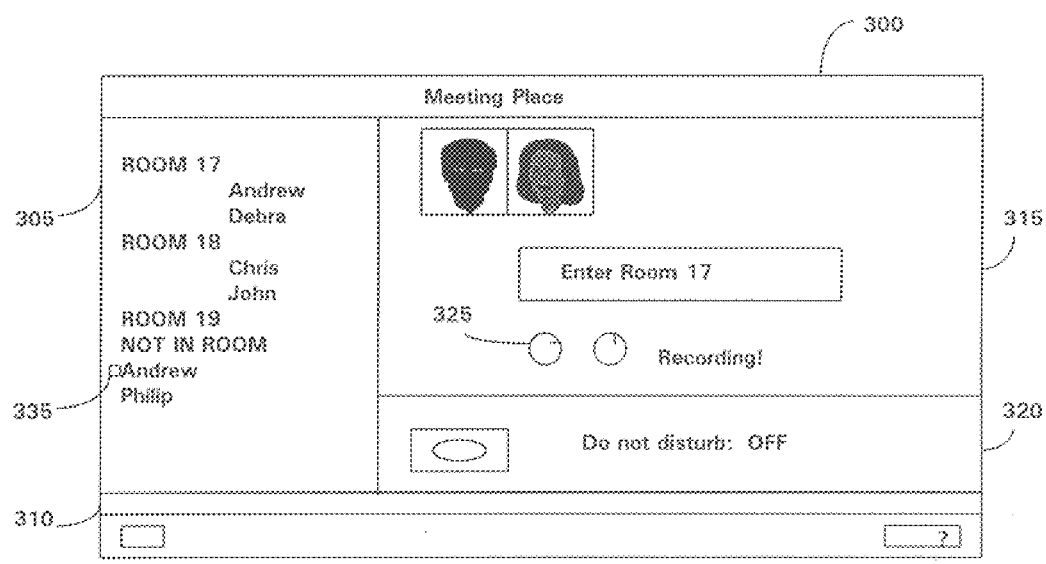
FIG. 3 shows a graphical user interface for use at a client browser for the system of FIG. 1.

Referring to FIG. 3, the user's browser 100 uses the javascript "OpenWindow" command to open up a main window as well as a smaller secondary window 300 which represents the 'meeting-place'. Additionally the on-line status field in the PERSON table in the database 125 is set to a value of 1 to indicate that they are logged in and their 'heartbeat' is initiated (see under "The Heartbeat process" below) by setting the heartbeat field in the PERSON table for this person to the current time to initiate the heartbeat process.

The meeting-place window 300 consists of 4 frames. A column 305 on the left shows a scrollable list of people who are logged on to the system. Beneath this, there is a very small frame 310 which is used to control the update process. In a right hand column, there is a main frame 315 which provides details about either a person or a conference. Below this, there is a smaller frame 320 which contains controls for recording the conference, setting privacy or sharing URLs.

As soon as a user logs onto the system, they see the names of all other users who are logged on at that time as well as a list of the current conferences and their participants in the form of a scrollable text list. The application object 200 achieves this by retrieving a list of those who are in the CONFERENCE and PERSON CONFERENCE tables in the database 125. It also gets a list of those who are logged on but not in a conference by looking at who has an on-line status of 1 in the PERSON table.

Others will also see the new user's name as soon as their respective meeting-place windows 300 are updated. When the system starts up, users are shown their own image together with the telephone number at which the system is currently programmed to dial them. All audio conferences taking place on the system are given a two or three digit identifier (room number) when they are initiated to assist users in telling each other where to rendezvous (the numbers are taken from a cycling range from 01 to 999). The arrival of a new user online is indicated by the temporary display of an indicator such as a coloured dot 335 adjacent the name (or names) of anybody who is newly arrived (see the "Butler" process below) and by the updating of the meeting-place screen of each user.

(FIG. 3 shows "Andrew" twice. These are different people.)

Meeting-place User Interface

The Meeting-place User Interface appears as a window 300 generated by a user's web browser on their personal computer 100. FIG. 3 shows a point where a user (Philip) has just clicked on the 'ROOM 17' link in the logged-on frame 305. This causes the system to show images of Andrew and Debra who are currently talking in this room by accessing the tables in the database 125. An icon 325 in the room frame 317 also shows that the conference is being recorded. User 'Andrew' has just logged onto the system so the Butler process is showing an indicator 335 adjacent to his name. Selecting the 'Enter Room 17' button causes the system to call up Philip's number and add him in to the conference.

Starting a Conference with Somebody who is Logged Onto the System

To find out about another user who is currently connected, the user clicks on the person's name. They are then shown a picture of the person together with a note of the dialback number of the nearest phone (see "Telephone Number Assignment and Mobility" below). There is also a button which gives the user (henceforth called the "originator") the option to set-up a conference. Once pressed, the request to set-up a conference is sent to the server 120.

The server 120 queues the request in the CONFERENCE-REQUEST table. The MAP object 205 subsequently retrieves the request from the table, creates entries in the CONFERENCE and PERSON-CONFERENCE tables, and instructs the Millenium CT 135 to set-up the conference using the following commands:

Conference Registration (register a conference with the Millenium CT)

Call Dial (to the originator)

Call Dial (to the other person)

Mix all Participants (mix the calls into an audio conference)

When the originator answers the call they are played a message telling them that an audio conference is being set up and asking them to wait. When the called person answers they too are given a message telling them that a conference is being set up.

Once both parties have answered, the calls generated by the system are connected together into a telephony based audio-conference and both entries in the PERSON table are updated with the conference number. The MAP object 205 updates the status field (to indicate success) in the CONFERENCE-REQUEST table in the database 125.

Whilst the conference is being established, the originator is shown a screen of cycling dots (generated by an animated GIF graphic) asking them to wait. Meanwhile a small secondary frame is reloaded using the client-pull HTML construct (for instance every 5 seconds). When the server receives a reload request, it inspects the status in the CONFERENCE-REQUEST table. If the status indicates the conference has been set-up, it returns HTML to the updated frame which causes the entire layout of the window to be reloaded. This mechanism thus updates the meeting-place windows 300 of both people to show they are connected in a conference and deletes the request from the CONFERENCE-REQUEST table. All other people who are connected to the system also have their meeting-place windows updated to show that the conference is in progress. This is achieved by updating the 'dummy' person entry in the PERSON table with the current time to indicate that the displays should be updated (see "The Update Process" below for details).

Telephone Number Assignment and Mobility

In environments such as schools, users of the system may wish to log on from any one of a number of terminals. To prevent the user from having to manually assign themselves the telephone number of the nearest phone each time they log on, this number is stored on the hard disk of each client machine. This can be achieved for instance by using a system such as that known as the "Netscape Client-side Cookie". This specifies the telephone number for the machine as well as a text string describing where it is located, for example "Andrew's office". When a user initially logs on to the system, a Javascript function located in the rooms frame of the meeting place will attempt to read any cookie which has previously been set by the system. If no cookie is found, or if a previously set cookie has expired, the rooms frame in the meeting place will inform the user that no telephone has been associated with the machine that they are using. (Note: cookies are set to have a fixed life, for example one year, after which they expire.) The rooms frame will then invite the user to choose a telephone by selecting from a pop-up menu of numbers which are allowable for that particular user. (This page is generated dynamically from information in the ADDRESS table in the database.)

Once a number has been selected from the menu, a cookie will be written with the information and the frame will reload to show the user's personal information with their new dialback number.

During initial logon, if the system detects that a cookie has been previously set, it will automatically assign the number from this cookie to the user for the duration of the session. Since the cookie setting activity need only be done rarely, it is possible for a system administrator to tour all machines which will be used and set cookies for each one. In this way, the end user need never have to go through the above process.

From time to time, it may be necessary to move a computer from one location to another or to use a different telephone line with a particular computer. In these circumstances, either a user or a system administrator can assess a "Phone number setting form" which contains Javascript code broadly similar to that mentioned above. The page has to be manually invoked and occupies a main window of the browser in this case. When the page is loaded, the appropriate cookie is read, if there is one, and the current number and location shown. The page also contains a popup menu of legal numbers which is assembled from the database. If a new number is selected, then the existing cookie is overwritten with the updated information. The page is also reloaded which causes the changed number and location to be shown.

Joining an Existing Conference

The user joins an existing conference by clicking on a text link denoting the conference's number. They are then shown the list of participants in the conference. There is also a button which gives the person the option to join the conference.

The server 120 queues the request in the CONFERENCE-REQUEST table. The MAP object 205 subsequently retrieves the request from the table, creates a new entry in the PERSON-CONFERENCE table, and instructs the Millenium CT 135 to set-up the conference using the following commands:

Call Dial

Mix all Participants (mix the calls into an audio conference)

The system starts by making an outgoing call to the person. When the person answers the call they are played a message telling them that they are being added to the conference. Whilst the conference is being established the person is shown a screen of cycling dots asking him or her to wait. Meanwhile a small secondary frame is reloaded using the client pull HTML construct (for instance every 5 seconds). When the server receives a reload request it inspects the status in the CONFERENCE-REQUEST table. If the status indicates that the conference has been established, it returns HTML to the updated frame which causes the entire layout of the window to be reloaded. This mechanism thus updates the meeting-place windows of both people to show they are connected in a conference and deletes the request from the CONFERENCE-REQUEST table. After a short delay they are added in to the conference and the request is deleted from the CONFERENCE-REQUEST table.

The arrival of a new user in a conference is indicated with a short auditory tone, by the temporary display of an indicator such as a coloured dot adjacent to the names of any users who are newly arrived on-line (see the "Butler process" described below) and by the updating of the meeting-place screen 300 of all users. Those users who are in the room in question are shown an image of the person who has just joined. If they move their mouse cursor over this image they are shown the person's name in the status bar of the window. Users may continue to join a conference until it has grown to the maximum size allowable by the system (30 people in the embodiment being described here). Whenever more than 8 people are present in the same conference the display is changed to show only the names of users rather than their pictures.

Inviting Into a Conference

Users who are already in an established conference can choose to invite other people who are logged on to the system to take part as well. They do this by clicking on the name of such a person in the logged-on frame (only the names of people who are not logged in to a conference are shown as active HTML links at this time). When the person's name is clicked, the user is shown a confirm message in the control frame. If they confirm that they do indeed want to invite the person into the conference, the system will initiate a call to that person and try to add them to the conference.

The commands to the Millenium CT under these circumstances are the same as when someone joins a conference (see "*Joining an Existing Conference*", above). Once the person has answered the phone, they are added into the conference and the meeting-place window 300 is updated for all users.

Removing a Person from a Conference

From time to time, those already in a conference may invite another user to take part but in practice only reach the person's answering machine or voicemail. To recover from this situation, any of the other conference participants may clear the call to the answering machine. They do this by clicking on the name of the "person" that they want to remove in the logged-on frame. This results in a confirmation dialogue which is shown in the control frame. If the action is confirmed, the system will clear the call to the answering machine and remove this "person" from the conference. The conference can then continue as normal with the remaining participants.

The commands to the Millenium CT 135 under these circumstances are as when somebody leaves a conference. See "Ending a Conference" below.

Ending a Conference

Once created, a conference continues to exist as long as more than one person is in it. Users can leave a conference at any time by pressing a button on the meeting-place window 300. When this happens, the Millenium CT 135 is sent the "Call Clear" command to clear the call, causing the Millenium CT 135 to drop the phone connection. The meeting-place 300 is then updated to show the person is no longer in the conference. This is achieved by updating the entry in the CONFERENCE table to indicate that the displays should be updated (see "*The Update Process*" below).

The Millenium CT 135 disconnects the last person if there is only a single person left in a conference after someone has left. Once the last person has been disconnected, the MAP object sends a 'conference registration' command to the Millenium CT 135 to de-register the conference. The meeting-place windows 300 of all users are then updated.

An alternative way of leaving a conference is for users to simply put down their phone. In the current implementation of ISDN in the UK the Millenium CT 135 is not notified by the telephone exchange that a person has cleared their call for 2 minutes. (After this time, the exchange sends a "call clear" DASS2 message to the Millenium CT.) A forthcoming modification of the BT network to European ISDN (ETSI)

standards should mean that the Millenium CT 135 will be able to detect cleared-down calls in the near future.

The Update Process

It is necessary to update the meeting-place window 300 of each user who is connected to the system whenever a significant event occurs. These events are when:

A user comes on-line or is logged out (see next section)

A user enters or leaves an audio conference

A user shares a URL (see below)

A user starts or stops recording an audio-conference (see below)

When the conference privacy status is changed

When such an event happens, the time and date at which the event occurred is stored in the GROUPS table (for individual users) and in the CONFERENCE table (for conference related events).

The update process works by using the client-pull HTML construct from within a small frame 310 in the meeting-place window 300. Every few seconds (for instance every 15 seconds) this window is set to "update". When the server 120 receives an update request from the update frame 310, it compares the time and date when it last received an update request from the update frame 310 for this user (this is called the heartbeat—see "*The Heartbeat Process*" below) with the time the meeting-place was last changed. If the information to be displayed has changed since the last time, then a new version of the update page is sent back. This includes a javascript function which stipulates that the other frames of the meeting-place 300 should be re-loaded as soon as the update frame is itself loaded (the OnLoad event handler is used), The advantage of this approach is that it does not increase traffic to the server, load on the client or visual distraction for the user by reloading all the frames even when nothing applicable to that user has changed. On the other hand it does not require multiple channels to be kept open for each user in the way that a protocol such as "server push" does.

The Heartbeat Process

The update requests are also used as a 'heartbeat' function which lets the server know the user is still logged in ('alive'). The Heartbeat object 215 running on the server 120 polls the database 125 frequently (for instance every 30 seconds). If the heartbeat value in the PERSON table for this user is over a minute old, the heartbeat object 215 deems that the user has closed down their meeting-place 300 and left the system. In such cases the user is logged out by updating their on-line status field in the PERSON table. That user will no longer appear as being on-line in other users' meeting-places.

Sharing URLs

When users are connected together in a conference they can share a URL with each other. This may be useful for instance when a person wants others who they are talking with to see the same WWW page that they are looking at. To share a URL, a user either manually types or copies and pastes the relevant text string into an HTML generated text box in the control frame 320 of the meeting-place 300. The user then either presses the 'return' button or activates a 'share URL' button. This causes the URL to be associated with the user for the rest of the conference by storing this URL in the PERSON table for that user. This is indicated visually in the meeting place window 300 of all conference participants by showing a small graphic with the word 'link' beneath the image 330 of the sending user. This is achieved by updating the entry in the CONFERENCE table to indicate that the displays should be updated (see "The Update Process" above).

If the person stipulates a subsequent link during the course of the same conference then the colour of the link graphic changes to show that a new link has been specified for that person (this is also stored in the PERSON table). Others in the conference can click on a link graphic to see the associated URL opened up in a new window on their browser.

Recording a Conference

Users can choose to record a conference so that they can play it back later. The originator's meeting-place 300 has an additional icon 325 which allows them to record the conference. If the originator drops out of the conference leaving others talking, then the recording control is passed to whoever has been in the conference for the next longest time. The idea behind this approach is to avoid conflicting requests for starting and stopping a recording that may be generated if all users have their own recording control.

Alternatively, all participants in a conference may have an icon which allows them to record the conference. When a person presses the 'start recording' button they are prompted to give the recording a name and to type this into a text entry box. (The recording has a separate, system-generated unique name so it is not mandatory that the user give the recording a unique name).The user then submits the recording name using a button. A recording request is then queued with the server 120 requesting that the conference be recorded. The MAP object 205 then sends the Millenium CT 135 the 'Record Start' message to start recording the conference. Whilst the recording is being initiated, the person is shown the screen of cycling dots asking them to wait. When the recording is started the request is deleted from the CONFERENCE-REQUEST table. The start of the recording is indicated to the users with an auditory tone and a short voice announcement made to the conference. The recording button in the person's meeting-place is replaced by an animated 'recording-in-progress' icon (this is pressed again to stop recording). Other users are shown an animated icon indicating that a recording is taking place. This is achieved by updating the entry in the CONFERENCE table to indicate that the displays should be updated (see "The Update Process" above).

When the originator presses the 'stop recording' button, a confirmation dialogue appears in the control frame. If the user confirms that they want to stop the recording, the system sends 'Record Stop' and 'Record Save' messages to the Millenium CT 135. Once the recording has been saved, the animated recording icon from the person's meeting-place 300 is removed and replaced by the 'start recording' button—other users are also now shown an icon indicating that no recording is taking place. This is achieved by updating the entry in the CONFERENCE table to indicate that the displays should be updated (see "The Update process" above). Subsequent parts of the conference may then be recorded if desired.

The MAP object 205 will automatically stop a recording if the last person leaves a conference and the originator has not specifically stopped the recording. The recording will still be saved in these circumstances.

The Millenium CT 135 stores the recording as a 64 Kbps PCM encoded speech file. The file is subsequently converted and placed on the WWW server where it can be listened to by the conference participants. Preferably, the file is converted into "RealAudio 3" format thus allowing long sound files to be heard without having to first download the entire file to their computers.

Pages on the system can contain links to the RealAudio files representing previously recorded conversations. Since the system uses a database to build HTML pages dynamically it is possible to provide the link to the sound file in the context of a page which indicates when the recording was made, who originated it, and who took part in it. This is achieved by storing this information in the database when the 'Record Save' message is sent to the Millenium CT 135.

Making a Personal Recording

In addition to recording a conference it is possible to use the system to record one's own voice only. This feature can be used for recording voice messages or for pronunciation exercises for example. Whenever a user is on line but not in a conference they have the option of clicking on the 'Record' button in the control frame of the meeting place. When they do this they are prompted to give the recording a name and to type this into a text entry box (the recording has a separate system generated unique name so it is not mandatory that the recording be named with a unique identifier). Once a name has been submitted to the system an outgoing call is initiated to the user's number and they are placed in a private (or "single user") conference in which they are the only participant. As soon as the conference is set up the recording request is automatically queued to the server. The MAP object 205 then sends the Millenium CT 135 the 'Record Start' message to start recording the conference. The user hears a voice announcement shortly after the start of the conference to tell them that recording has begun. They also are shown an animated 'recording' icon.

When the user has finished making their recording they can press the animated recording button to stop the recording. This is achieved by sending the Millenium CT 135 a 'Record Stop' message. At this stage they are shown a series of icons which allow them to play back, delete, or save the recording. If they choose the 'Play' icon, the 'Playback start' message is sent to the Millenium CT 135 and the recording is played back to the user over the phone connection from the beginning. Whilst this is happening the play icon is replaced with an animated version. When the recording reaches the end of playback it loops to start from the beginning again. If the user selects the animated play icon then playback stops. If the user selects 'Save' then the recording is saved to RealAudio format. This is achieved by sending the Millenium CT 135 a 'Save Recording' message. If the user does not want to keep the recording they can select the 'Delete' icon which removes the recording by sending the Millenium CT 135 a 'Delete Recording' message. If the user leaves the private conference without saving their personal recording then the recording will be saved automatically. After choosing to save or delete a recording the user may go on to make more recordings whilst in the same conference

Privacy

The system aims to give users the greatest opportunity to see who else is logged on to the system whilst also protecting people from unwanted instrusion. This is done by allowing individuals to set their status as 'Do not disturb' and by letting the originator of a conference set up its status as 'Private'. The 'Do not disturb' status flag is stored in the PERSON table for that user whilst the 'Conference Privacy' status is stored in the CONFERENCE table for that conference. If a person registers themselves as 'Do not disturb' then others will have this status explained to them when they click on the person's picture; they will not be able to enter into a conference with that person. If a conference is private then other people will not be able to enter it and will be shown that it is private when they ask for detail on it. Both "Do Not Disturb" and "Privacy" functions are implemented with toggling on/off controls.

Another privacy advantage of embodiments of the present invention is that subscribers to a service need not disclose their phone number to other users—it is held on the database and used to dial calls to the user but need not be visible directly to others.

The Sleep Function

One of the problems to be overcome with any virtual meeting-place is that users may log on to the system and then leave their computers to go somewhere else. This can lead to other users attempting to set-up conferences with them only to be confronted with answering machines. This problem can be solved as described above under "Removing a Person from a Conference" and this is the preferred method. However, another solution to this problem is to have the database 125 keep a record of all page load requests which are made by a particular user (other than regular meeting-place update requests). Each time such a request is received, a counter is reset. If the counter reaches a designated value (equivalent to, say, 10 minutes of elapsed 'silence' from the user) the user will be designated as asleep. At this stage if another user clicks on the "sleeping" person's name they will be shown a page in the main frame 315 of the meeting-place 300 telling them that the other person is asleep. In such cases, users can manually dial the person or send them email.

The meeting-place window 300 of the person who is designated as asleep changes to tell them this. There is a button labelled 'wake me up' which can be pressed to restore the user's status to 'awake' on the system's database. They will then be able to initiate or be invited into audio conferences once more.

Handling Errors and Unusual States

Error messages are displayed to the user whenever an audio-conference request (eg set-up a conference or leave a conference) fails. The request usually fails because the Millenium CT 135 has been unable to make a call since the called party is either engaged, not answering, or their phone number is unavailable (NU). In such cases the Millenium CT 135 indicates the reason for failure in the 'Make Call' response message returned to the MAP object 205. The MAP object 205 then sets the status in the request in the CONFERENCE-REQUEST table to indicate the reason for failure. When the server 120 receives a reload request from the client (that is currently displaying the cycling dots) it inspects the status in the request in CONFERENCE-REQUEST table. Upon finding that the request has failed it returns an error page to the client 100 describing the reason for failure. The user may then read this and return to the meeting-place 300 by clicking on a "continue" button. If they do not do this the error page will automatically re-load the meeting-place 300 after 30 seconds.

Billing

The system provides the opportunity to bill users on the basis of subscription, usage or some combination of the two.

Since all audio conferencing telephone calls are outgoing from the Millenium CT platform 135 it is possible to offer users a special tariff for exclusive use with calls to other registered users. The charging structure for other general calls which the user makes need not be adjusted.

The database stores a range of allowable dialback numbers for each user. This allows people to use the service from more than one location. Since users are prevented from entering their own dialback numbers, which have to be authorised by a system administrator, the potential for using the system fraudulently to obtain discounted telephone calls to any destination is removed. The database records the name of each user who initiates an audioconference, the duration of that audioconference and the names of people who took part in the conference, together with the lengths of time for which they took part. This data can be used to charge the conference originator, the participants or both parties on a time basis. All such information is stored in the database 125 together with time and date stamps. The database 125 records the time and date at which each user account is created or closed down. This information can be used to facilitate subscription based charging.

The "Butler" Process

The butler process is intended to alert users whenever a new person comes on line, for example by playing a sound such as a bell. At this point an indicator 335 (e.g. a coloured dot) is also shown adjacent to the names of any newly arrived users in the frame 305 and the meeting place window is brought to the front of the browser. The indicator persists until a new update takes place or for 2 minutes—whichever period is shorter.

For each person's name that appears in the "logged on" frame of the meeting place a 'registerUser' javascript function is called in the layout code for the meeting place window. This function adds the name of the user in question to an array. It also checks a 'previous' array which contains a list of all those users who were present the last time the logged on frame was loaded. If a particular name features in the current list but not in the previous list then it is judged to be new and the function returns a 'true' value to the code in the logged on frame. This is what causes the indicator to be displayed by the name of each new user. Once all names in the logged_on frame have been 'registered' in this way the 'onLoad' event for this frame is used to call a second 'butler' function in the layout document. This simply checks whether any items in the 'current' array are different from those in the 'previous' array. If this is the case then a java applet is called in the 'tools' frame of the meeting place using the LiveConnect protocol embedded in the browser. The function of this applet is simply to play a sound of a designated name. In the case of the butler a 'bell' sound is played by the client. The registerUser function increments a variable value each time it is called (starting from 0). Whenever this value is less than 1 the function still adds the names to the current array but it does not display an indicator near a 'new' name, and the butler function does not generate its bell sound. This is to avoid names appearing as 'new' when the system is starting up.

Functional Breakdown of the Objects Supporting the System

Referring to "*Server Software Architecture*" above, four objects installed at the server 120 support the functionality described above. These are the application, Millenium CT, database and Heartbeat objects 200, 205, 210. 215. Functionally, these deal as described with different aspects of the system.

Figure 4:
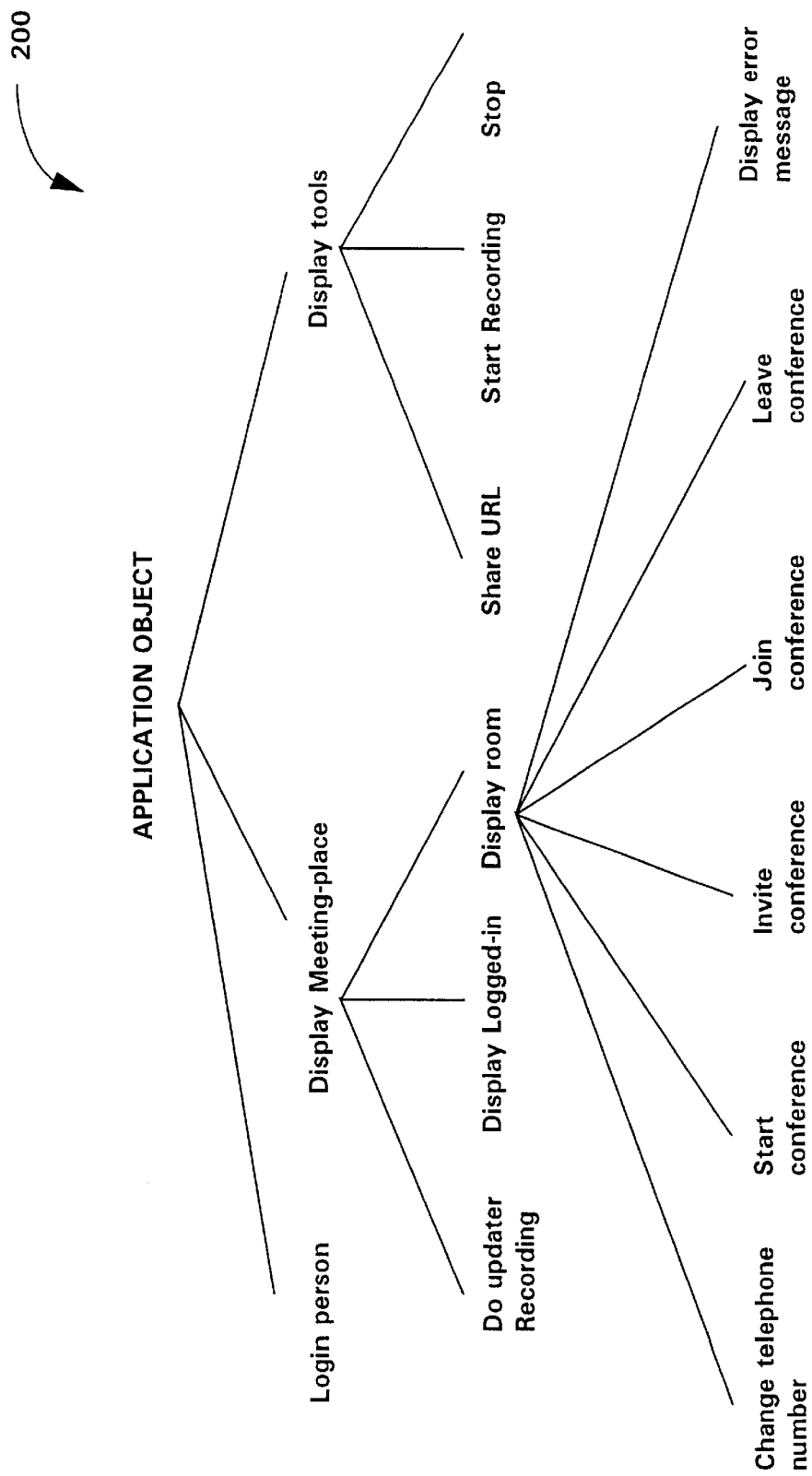
FIGS. 4, 5, 6 and 7 show functional breakdowns of objects for use in an application residing on a server in a system as shown in FIG. 1.

Referring to FIG. 4, the application object 200 deals with the conference controls offered to the user by means of the meeting place screen 300:

| | |
|---|---|
| 1 | Login person |
| 2 | Display meeting place |
| 2.1 | Do updater |
| 2.2 | Display logged-on |
| 2.3 | Display room |
| 2.3.1 | Change telephone number |
| 2.3.2 | Start conference |
| 2.3.3 | Invite conference |
| 2.3.4 | Join conference |
| 2.3.5 | Leave conference |
| 2.3.6 | Display error message |
| 3 | Display tools |
| 3.1 | Share URL |
| 3.2 | Start recording |
| 3.3 | Stop recording |

Figure 5:
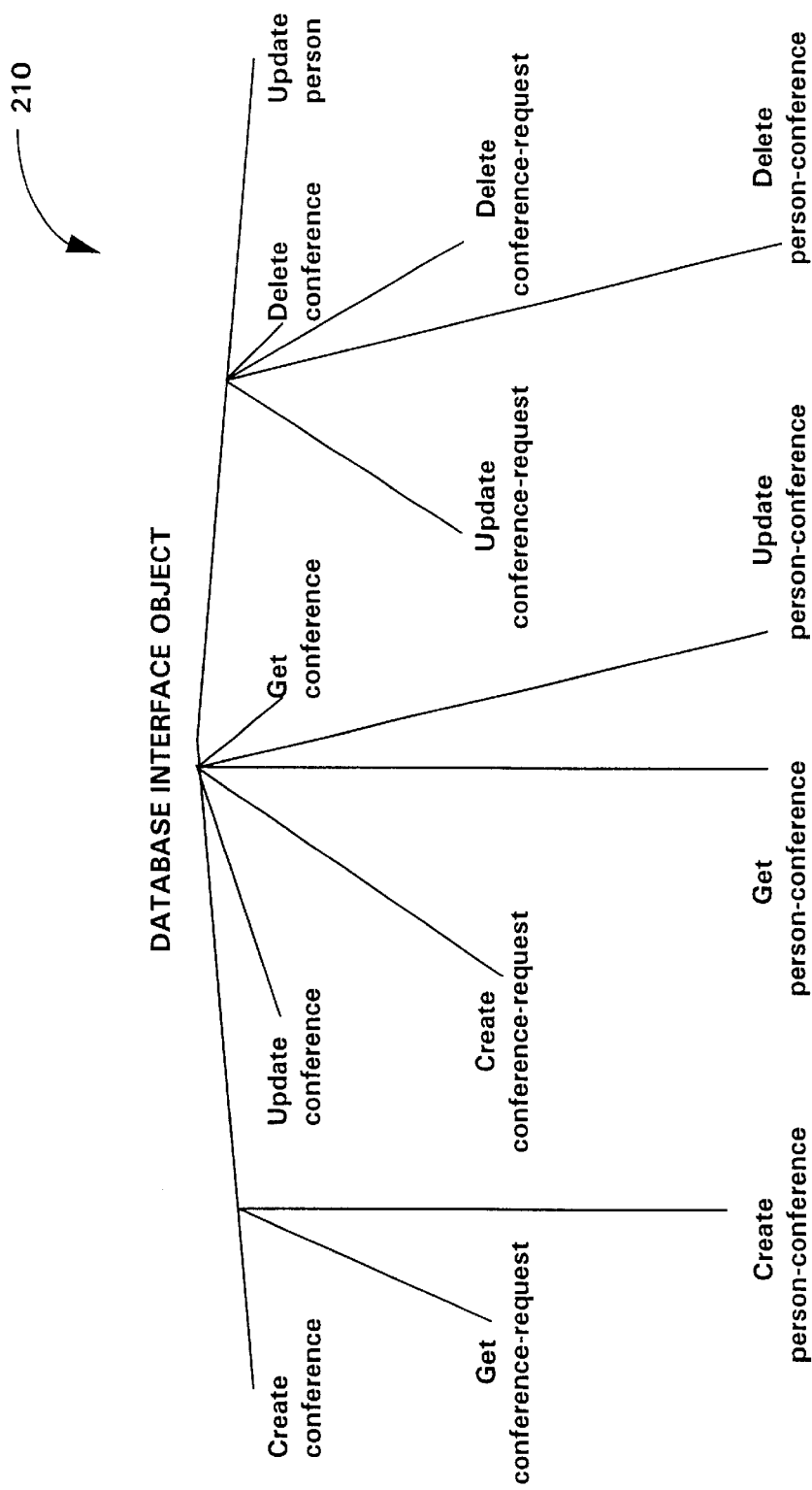

Referring to FIG. 5, the database object 210 deals with the interface to the database 125:

| | |
|---|---|
| 1 | Create conference |
| 2 | Get conference-request |
| 3 | Create person-conference |
| 4 | Update conference |
| 5 | Create conference-request |
| 6 | Get person-conference |
| 7 | Update person-conference |
| 8 | Get conference |
| 9 | Update conference request |
| 10 | Delete person conference |
| 11 | Delete conference-request |
| 12 | Delete conference |
| 13 | Update person |

Figure 6:
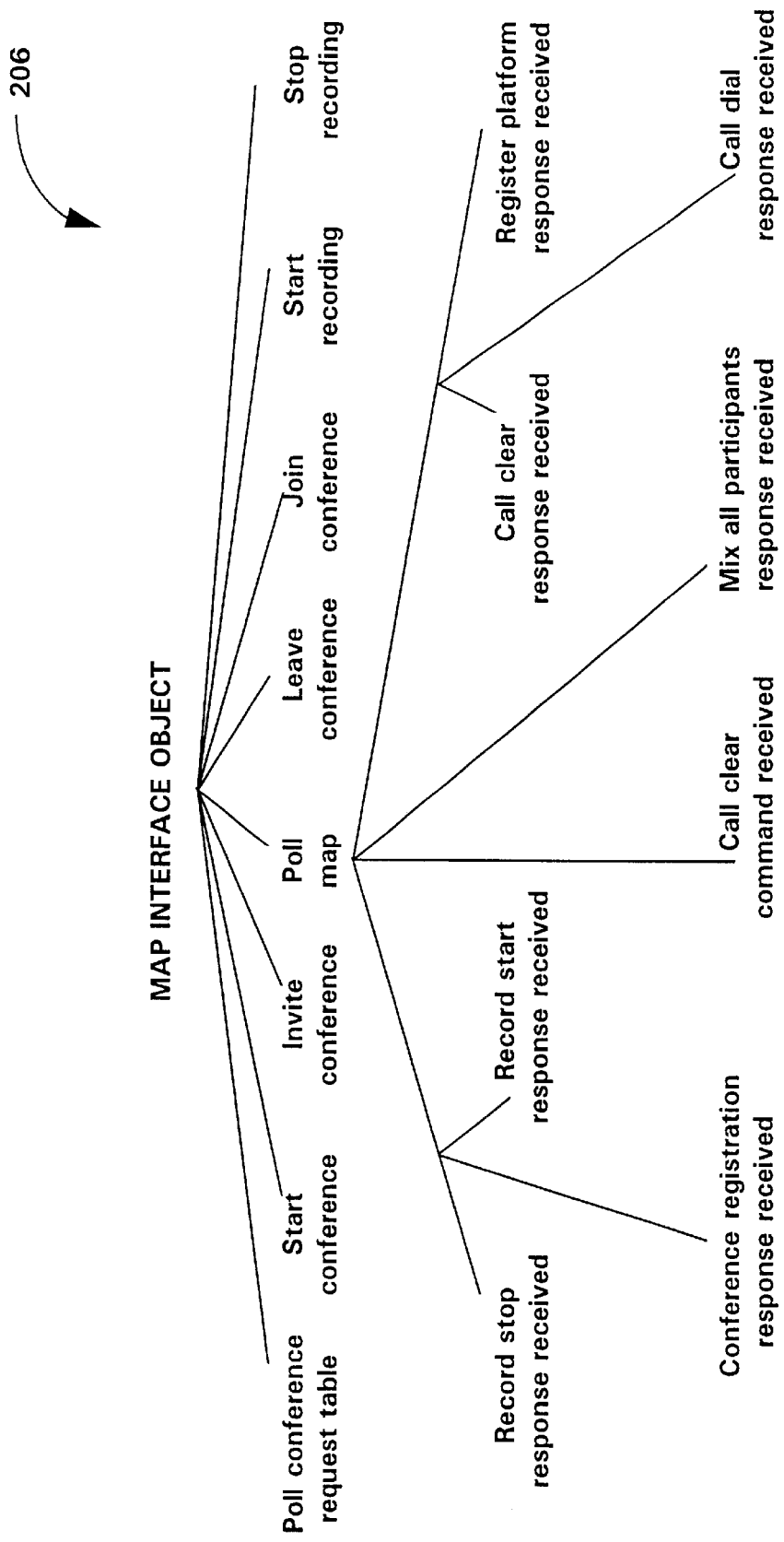

Referring to FIG. 6, the MAP object 205 deals with the interface to the Millenium CT 135:

| | |
|---|---|
| 1 | Poll conference request table |
| 2 | Start conference |
| 3 | Invite conference |
| 4 | Poll Millenium CT |
| 4.1 | Record stop response received |
| 4.2 | Conference registration response received |
| 4.3 | Record start response received |
| 4.4 | Call clear command received |
| 4.5 | Mix all participants response received |
| 4.6 | Call clear response received |
| 4.7 | Call dial response received |
| 4.8 | Register platform response received |
| 5 | Leave conference |
| 6 | Join conference |
| 7 | Start recording |
| 8 | Stop recording |

Figure 7:
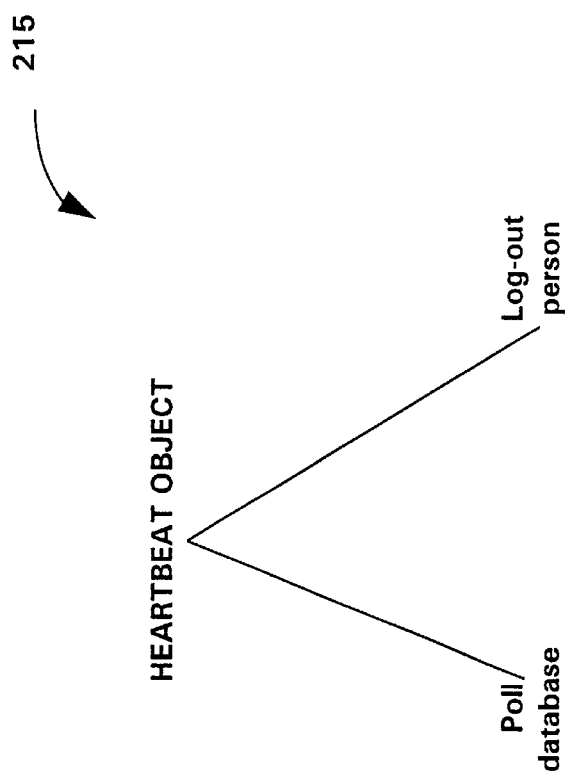

Referring to FIG. 7, the Heartbeat object 215 simply deals with monitoring an area of the database 125 and logging out users appropriately:

| | |
|---|---|
| 1 | Poll database |
| 2 | Log-out person |

Potential Uses for the System

The system allows groups of people to talk to each other and achieve a shared view of information without requiring that participants either learn a complex set of controls or invest in specialist equipment or software at the client end. The equipment at the server end is not particularly complex either and can be readily set up as part of a small business operation, company department or educational service for example. The system is about providing a basis for conversation and information exchange—the exact nature of the conversation and information traded is not constrained so there might be a wide variety of potential uses such as:

- application as an educational tool—in particular for teaching languages
- use by sales teams to encourage greater communication with clients
- use by fan clubs to talk about ongoing or recent events such as football matches
- application as part of a customer support system for a product or service
- use as a social meeting device
- use within business as a method for helping geographically separated groups to collaborate The system can be deployed either as a small scale set-up involving PC based audio conferencing platforms such as the Millenium CT 135, or to provide larger scale services on platforms such as the "integrated Speech Applications Platform" (iSAP) which has been developed by British Telecommunications plc. In the case of deployment on a PC based audio conferencing platform such as the Millenium CT 135, the overall group size on any platform is generally limited to 60 users by the system's capacity although a service can be spread over a bank of such platforms running in parallel. On the iSAP, the maximum size of an individual group would again tend to be 60 (limited by the capacity of each shelf on the iSAP) although a very much larger overall user group could be catered for.

Whatever the scale of the platform on which the audio conferencing takes place it is possible to implement the service in such a way that more than one separate group can share the same platform (or bank of platforms). Users in group A will see only the names of other users in group A—but not the names of users in group B or C for example. This separation can be achieved entirely through partitioning into groups in the database 125.

Whilst the system described above is based on standard PCs and telephones, using separate connections for voice and data, it is envisaged that the approach could be adapted to work equally effectively on systems where both datatypes were sent down the same line. This would include Internet based systems. The approach is also adaptable to systems which use mobile telephony, which involve phones with built in web browsers or which use a headset connected via the soundcard of a PC rather than a separate telephone.

Although the good audio quality provided by embodiments of the present invention is particularly attractive to the human user, there may be applications in which there are no human users involved in a conference at all. For instance there may well be applications in which audio quality is still important but for the purpose of accuracy of recording or of communication between a recording and a machine. Hence use of the term "user" in this specification should not be taken as a limitation to human users alone.

It will be recognised that the software, the computing capabilities, described above can be distributed in different ways across suitable platforms for supporting it. For instance, although management capabilities for conferencing are described as being predominately separate from a Millenium CT platform, in practice many (or even all) of the capabilities may be provided within the domain of the Millenium CT software. In this case, the conferencing management capabilities might run as applications which the Millenium CT itself triggers. However, for many scenarios it may be preferred that the conferencing software can be provided separately from the platform for controlling a network. A small business user could then install the conference capability at relatively low cost and access platform such as the Millenium CT only when required.

What is claimed is:

1. A management and control unit for a network-based audio conferencing system, the unit comprising:
   i) an input interface to a data network, for receiving control signals from at least one first platform for providing a graphical user interface to a user, for use in controlling the network-based conferencing system;
   ii) an output interface for outputting control signals to a second platform for establishing audio connections across a telecommunications network for use in establishing audio conference connections between users;
   iii) an interface for providing access to a database for maintaining, including updating, management data relating to one or more existing conferences; and
   iv) control means, said control means being arranged in use:
      a) to respond to a control signal received at the input interface in respect of a conference, to output one or more control signals to establish a conference connection;
      b) to output management data to the database in respect of one or more existing conferences;
      c) to output management data from the database to the graphical user interface during said one or more existing conferences for use by a user in managing the conference; and
      d) to proactively determine a status of a user on the basis of time elapsed since receipt of a signal relating to that status and, in the event that the magnitude of the time elapsed satisfies a respective trigger criterion indicative of a change in that status, to include in said management data output to the database an update to a corresponding status data field associated with that user to indicate that change of status.

2. A management and control unit as in claim 1, which further comprises said second platform for establishing audio connections.

3. A management and control unit as in claim 1 wherein the unit is provided on a server which is connected to a data network.

4. A management and control unit as in claim 3 wherein at least one of the input and output interfaces is adapted to accommodate an Internet-compatible communication protocol.

5. A management and control unit as in claim 1 wherein the management data comprises an interpretation table for interpreting between (a) identifiers for specific users, said identifiers being selectable by a user at a graphical user interface, and (b) network locations for those specific users in the network, such that a user can establish a conference connection with another user by selecting the relevant identifier in place of a network location.

6. A management and control unit as in claim 5 wherein the management data maintained in the database comprises a set of network locations allocated to an identifier for a single user, and the management and control unit comprises means for selecting one of the network locations in response to selection of the identifier by a user at a graphical user interface.

7. A management and control unit as in claim 5 wherein the unit further comprises authorising means for authorising an input to the management data maintained in the database where the input comprises a network location.

8. A management and control unit as in claim 5 wherein the network locations comprise telephone numbers.

9. A management and control unit as in claim 1 which further comprises means for recording a conference.

10. A management and control unit as in claim 1, wherein the output management data to the graphical user interface comprise alert data, in response to the addition of a user to an existing conference, which alert data triggers the graphical user interface to provide a generic indication that a new user has joined the conference.

11. A management and control unit as in claim 1 which further comprises means for outputting an audible signal to a user.

12. A management and control unit as in claim 1 which further comprises means for detecting an identifier for a platform for providing a graphical user interface to a user, on receipt of a control signal from such a platform, and for translating the identifier to a network location for a telecommunications terminal associated with said platform, for use in establishing a conference connection to said network location.

13. A management and control unit according to claim 1 wherein the update to the status data field indicates that the user is logged out with respect to the conference.

14. A management and control unit according to claim 13, the unit further comprising an output interface to a data network, for outputting data to each platform providing a graphical user interface to a user logged in with respect to the conference, wherein, in the event that a user is logged out, data is output to each such platform to remove an indication in the graphical user interface that the logged out user is online in respect of the conference.

15. A management and control unit according to claim 1 wherein the update to the status data field indicates that the user is asleep.

16. A management and control unit according to claim 1 wherein the signal relating to that status comprises a page load request.

17. A management and control unit as in claim 1, wherein the control means determines a Sleep status of a user on the basis of time elapsed since receipt of a user-generated input signal from that user.

18. A management and control unit as in claim 1, wherein the control means determines a Logged Off status of a user on the basis of time elapsed since receipt of a terminal-generated input signal from that user's terminal.

19. A management and control unit for a network-based audio conferencing system, the unit comprising:
 i) an input interface to a data network, for receiving control signals from at least one first platform for providing a graphical user interface to a user, for use in controlling the network-based conferencing system;
 ii) an output interface for outputting control signals to a second platform for establishing audio connections across a telecommunications network for use in establishing audio conference connections between users;
 iii) an interface for providing access to a database for maintaining, including updating, management data relating to one or more existing conferences; and
 iv) control means, said control means being arranged in use:
  a) to respond to a control signal received at the input interface in respect of a conference, to output one or more control signals to establish a conference connection;
  b) to output management data to the database in respect of one or more existing conferences; and
  c) to output management data from the database to the graphical user interface during said one or more existing conferences for use by a user in managing the conference; and
  means for responding to an update request from a platform for providing a graphical user interface to a user by reviewing whether there has been a change to data determining a screen displayed at the graphical user interface and sending update data only in the event that there has been such a change.

20. A management and control method for a network-based audio conferencing system, the method comprising:
 i) receiving control signals from at least one first platform for providing a graphical user interface to a user, for use in controlling the network-based conferencing system;
 ii) outputting control signals to a second platform for establishing audio connections across a telecommunications network for use in establishing audio conference connections between users;
 iii) providing access to a database for maintaining, including updating, management data relating to one or more existing conferences;
 iv) responding to a received control signal in respect of a conference, by outputting one or more control signals to establish a conference connection;
 v) outputting management data to the database in respect of one or more existing conferences;
 vi) outputting management data from the database to the graphical user interface during said one or more existing conferences for use by a user in managing the conference; and
 vii) proactively determining a status of a user on the basis of time elapsed since receipt of a signal relating to that status and, in the event that the magnitude of the time elapsed satisfies a respective trigger criterion indicative of a change in that status, including in said management data output to the database an update to a corresponding status data field associated with that user to indicate that change of status.

21. A management and control method as in claim 20 further comprising establishing audio connections via said second platform.

22. A management and control method as in claim 20 wherein the method is implemented on a server which is connected to a data network.

23. A management and control method as in claim 22 wherein an Internet-compatible communication protocol is accommodated.

24. A management and control method as in claim 20 wherein the management data comprises an interpretation table for interpreting between (a) identifiers for specific users, said identifiers being selectable by a user at a graphical user interface, and (b) network locations for those specific users in the network, such that a user can establish a conference connection with another user by selecting the relevant identifier in place of a network location.

25. A management and control method as in claim 24 wherein the management data maintained in the database comprises a set of network locations allocated to an identifier for a single user, and the method further comprises selecting one of the network locations in response to selection of the identifier by a user at a graphical user interface.

26. A management and control method as in claim 24 wherein the method further comprises authorising input to the management data maintained in the database where the input comprises a network location.

27. A management and control method as in claim 24 wherein the network locations comprise telephone numbers.

28. A management and control method as in claim 20 which further comprises recording a conference.

29. A management and control method as in claim 20 wherein the output management data to the graphical user interface comprises alert data, in response to the addition of a user to an existing conference, which alert data triggers the graphical user interface to provide a generic indication that a new user has joined the conference.

30. A management and control method as in claim 20 which further comprises outputting an audible signal to a user.

31. A management and control method as in claim 20 which further comprises detecting an identifier for a platform for providing a graphical user interface to a user, on receipt of a control signal from such a platform, and translating the identifier to a network location for a telecommunications terminal associated with said platform, for use in establishing a conference connection to said network location.

32. A management and control method as in claim 20 wherein the update to the status data field indicates that the user is logged out with respect to the conference.

33. A management and control method according to claim 32, the method further comprising outputting data to each platform providing a graphical user interface to a user logged in with respect to the conference, wherein, in the event that a user is logged out, data is output to each such platform to remove an indication in the graphical user interface that the logged out user is online in respect of the conference.

34. A management and control method according to claim 20 wherein the update to the status data field indicates that the user is asleep.

35. A management and control method according to claim 20 wherein the signal relating to that status comprises a page load request.

36. A management and control method as in claim 20, wherein determining the status of a user comprises determining a Sleep status of a user on the basis of time elapsed since receipt of a user-generated input signal from that user.

37. A management and control method as in claim 20, wherein determining the status of a user comprises determining a Logged Off status of a user on the basis of time elapsed since receipt of a terminal-generated input signal from that user's terminal.

38. A management and control method for a network-based audio conferencing system, the method comprising:
  i) receiving control signals from at least one first platform for providing a graphical user interface to a user, for use in controlling the network-based conferencing system;
  ii) outputting control signals to a second platform for establishing audio connections across a telecommunications network for use in establishing audio conference connections between users;
  iii) providing access to a database for maintaining, including updating, management data relating to one or more existing conferences;
  iv) responding to a received control signal in respect of a conference by outputting one or more control signals to establish a conference connection;
  v) outputting management data to the database in respect of one or more existing conferences; and
  vi) outputting management data from the database to the graphical user interface during said one or more existing conferences for use by a user in managing the conference; and
  vii) responding to an update request from a platform for providing a graphical user interface to a user by reviewing whether there has been a change to data determining a screen displayed at the graphical user interface and sending update data only in the event that there has been such a change.

39. A management and control unit for a network-based audio conferencing system, the unit comprising:
  i) an input interface to a data network, for receiving control signals from at least one first platform for providing a graphical user interface to a user, for use in controlling the network-based conferencing system;
  ii) an output interface for outputting control signals to a second platform for establishing audio connections across a telecommunications network for use in establishing audio conference connections between users;
  iii) an interface for providing access to a database for maintaining, including updating, management data relating to one or more existing conferences; and
  iv) a controller which:
    a) responds to a control signal received at the input interface in respect of a conference, to output one or more control signals to establish a conference connection;
    b) outputs management data to the database in respect of one or more existing conferences;
    c) outputs management data from the database to the graphical user interface during said one or more existing conferences for use by a user in managing the conference; and
    d) proactively determines at least one of a Sleep status and a Logged Off status on the basis of time elapsed since receipt of at least one of user-generated and terminal-generated input signals from that user's terminal by determining whether the magnitude of the time elapsed satisfies a respective trigger criterion indicative of a change in at least one of the user's Sleep status and Logged Off status and includes in said management data output to the database an update to a corresponding status data field associated with that user to indicate that change of status.

40. A management and control method for a network-based audio conferencing system, the method comprising:
  i) receiving control signals from at least one first platform for providing a graphical user interface to a user, for use in controlling the network-based conferencing system;
  ii) outputting control signals to a second platform for establishing audio connections across a telecommunications network for use in establishing audio conference connections between users;
  iii) providing access to a database for maintaining, including updating, management data relating to one or more existing conferences;
  iv) responding to a received control signal in respect of a conference, by outputting one or more control signals to establish a conference connection;

v) outputting management data to the database in respect of one or more existing conferences;

vi) outputting management data from th e database to the graphical user interface during said one or more existing conferences for use by a user in managing the conference; and vii) proactively determining and changing a status of a user in light of an absence of signals from that user's terminal.

41. A method as in claim 40, wherein the signals from the user's terminal comprise user-generated signals resulting from the user's operation on the terminal.

42. A method as in claim 40, wherein the signals from the user's terminal comprise terminal-generated signals which are automatically and periodically generated from the terminal and transmitted when the terminal is in a Logged On status.

* * * * *